United States Patent
Goldberger

(10) Patent No.: US 8,810,462 B2
(45) Date of Patent: Aug. 19, 2014

(54) RIGID ELEMENTS EMBEDDED IN A MOTOR VEHICLE WINDSHIELD

(75) Inventor: Haim Goldberger, Modi'in (IL)

(73) Assignee: Origin GPS Ltd., Jerusalem (IL)

(*) Notice: Subject to any disclaimer, the term of this patent is extended or adjusted under 35 U.S.C. 154(b) by 868 days.

(21) Appl. No.: 12/686,391

(22) Filed: Jan. 13, 2010

(65) Prior Publication Data

US 2011/0169705 A1    Jul. 14, 2011

(51) Int. Cl.
*H01Q 1/32* (2006.01)
*B32B 17/10* (2006.01)
*H01Q 1/12* (2006.01)

(52) U.S. Cl.
CPC ..... *B32B 17/10036* (2013.01); *B32B 17/10871* (2013.01); *H01Q 1/1271* (2013.01)
USPC .......................................... 343/713; 156/102

(58) Field of Classification Search
USPC ................ 343/700 MS, 711, 713; 340/572.7; 428/432; 156/102
See application file for complete search history.

(56) References Cited

U.S. PATENT DOCUMENTS

| | | | |
|---|---|---|---|
| 3,414,902 A | 12/1968 | Shaw | |
| 3,579,243 A | 5/1971 | Dickason et al. | |
| 3,599,214 A | 8/1971 | Altmayer | |
| 3,615,986 A | 10/1971 | Dickason et al. | |
| 3,618,102 A | 11/1971 | Dickason et al. | |
| 3,673,044 A | 6/1972 | Miller et al. | |
| 3,680,132 A | 7/1972 | Tolliver | |
| 3,810,180 A | 5/1974 | Kunert et al. | |
| 3,810,184 A * | 5/1974 | Boicey et al. | 343/713 |
| 3,818,489 A * | 6/1974 | Bobel et al. | 343/713 |
| 3,845,489 A | 10/1974 | Sauer et al. | |
| 3,910,809 A | 10/1975 | Fern et al. | |
| 3,958,245 A | 5/1976 | Cherenko et al. | |
| 3,987,449 A | 10/1976 | DeAngelis et al. | |
| 4,260,989 A | 4/1981 | Ishii et al. | |
| 4,439,771 A | 3/1984 | Kume et al. | |
| 4,768,037 A | 8/1988 | Inaba et al. | |
| 4,849,766 A * | 7/1989 | Inaba et al. | 343/713 |
| 5,005,020 A | 4/1991 | Ogawa et al. | |
| 5,153,062 A * | 10/1992 | Grolig et al. | 428/336 |
| 5,324,374 A | 6/1994 | Harmand et al. | |
| 5,355,144 A * | 10/1994 | Walton et al. | 343/713 |
| 5,670,966 A | 9/1997 | Dishart et al. | |
| 5,792,298 A | 8/1998 | Sauer et al. | |
| 5,973,648 A | 10/1999 | Lindenmeier et al. | |
| 5,999,134 A * | 12/1999 | Dishart et al. | 343/713 |
| 6,275,157 B1 | 8/2001 | Mays | |
| 6,313,796 B1 * | 11/2001 | Potin et al. | 343/700 MS |
| 6,963,282 B1 * | 11/2005 | Yeates et al. | 340/572.4 |
| 7,379,028 B2 | 5/2008 | Hisaeda | |
| 7,460,072 B1 | 12/2008 | Goldberger | |
| 7,463,150 B2 * | 12/2008 | Rajan | 340/572.1 |
| 2003/0164800 A1 * | 9/2003 | Jordan et al. | 343/713 |
| 2004/0267419 A1 | 12/2004 | Jeng | |

* cited by examiner

*Primary Examiner* — Michael C Wimer
(74) *Attorney, Agent, or Firm* — Soroker-Agmon

(57) ABSTRACT

A method of embedding rigid elements in a windshield, including, cutting two sheets of glass in a desired shape to serve as an upper layer and lower layer of the windshield, inserting a layer of interlayer material for each of the two layers of glass, facing each other, between the two layers of glass, placing the rigid elements between the two layers of interlayer material, pushing the two layers of glass together to form a glass sandwich with the rigid elements and two layers of interlayer material between the upper and lower glass layers, heating the glass sandwich while applying pressure to form a unified sheet of glass; and wherein the combined thickness of the layers of interlayer material is at least as thick as the rigid elements.

11 Claims, 3 Drawing Sheets

RIGID ELEMENTS EMBEDDED IN A MOTOR VEHICLE WINDSHIELD

FIELD OF THE INVENTION

The present invention relates generally to the manufacture of a windshield with rigid elements embedded therein.

BACKGROUND OF THE INVENTION

Some mobile electronic devices include a miniature patch antenna to enable them to communicate and provide a service, for example GPS navigation systems, WiFi, Bluetooth, and satellite mobile TV. It is commonplace today for users to use such devices inside motor vehicles. However the motor vehicle, being an essentially metallic enclosure may interfere with the reception of the device or weaken the signal that arrives at the device.

In order to overcome this problem the device's antenna may be provided in a separate unit that can be placed outside of the motor vehicle, for example on the roof of the motor vehicle. Typically a cable is either permanently or temporarily extended from the antenna into the interior of the motor vehicle so that it can be connected to the device.

One drawback of an external antenna is that it is susceptible to damage from external sources, for example from natural sources such as wind or rain, or from non-natural sources such as colliding with objects or vandalism.

U.S. Pat. No. 6,275,157 to Mays et al. describes an embedded RFID transponder in vehicle window glass. Mays et al. describes embedding an RFID device that is made up from a flexible circuit substrate with an antenna formed thereon and a transponder circuit disposed on the substrate and coupled to the antenna. The flexibility of the RFID transponder allows it to be placed between glass layers without the circuit breaking or the glass breaking during the manufacturing process.

Miniature patch antennas for UPS, WiFi, Bluetooth and other applications are generally rigid elements since they require the use of rigid materials with high dielectric constants to achieve compactness. As a result there is a problem to embed them between the layers of the glass of the windshield of a motor vehicle.

SUMMARY OF THE INVENTION

An aspect of an embodiment of the invention, relates to a method of embedding a rigid antenna and/or integrated circuit in the windshield of a motor vehicle and to a windshield with a rigid antenna and/or integrated circuit embedded therein. In an exemplary embodiment of the invention, the windshield is prepared from two sheets of glass cut and bent into a desired shape. A layer of interlayer material (e.g. PVB) is coupled to each sheet of glass, facing the other layer of interlayer material. One or more rigid elements are placed between the layers of interlayer material. Optionally, the rigid elements are electrically connected together. In some embodiments of the invention, a flexible flat wire element is used to connect the rigid elements together electrically and to provide an electrical connection from the rigid elements out from in between the layers of glass, so that an electrical connection can be made with the rigid elements from outside the windshield. In an exemplary embodiment of the invention, the sheets of glass are pressed together and heated to cure the interlayer material and form a glass sandwich. Optionally, the combined thicknesses of the layers of interlayer material are equal to or greater than the thickness of the rigid elements, so that the rigid elements settle into the interlayer material without damaging the glass sheets.

In some embodiments of the invention, both layers of interlayer material are of the same thickness. Alternatively, one layer is thicker than the other, for example to provide extra protection to the top or bottom of the rigid elements or the glass sheets. In some embodiments of the invention, the rigid elements function independent of each other, for example each connected to an external device separately. Alternatively, the rigid elements are connected together electrically and optionally, function together.

In some embodiments of the invention, the rigid elements communicate via the flat wires with an external device. Alternatively or additionally, the rigid elements communicate wirelessly with an external device.

In some embodiments of the invention, the rigid elements include a rechargeable battery to power the rigid elements. Optionally, the battery is charged by a wire connection. Alternatively, the battery is charged wirelessly or by a photoelectric cell that absorbs electromagnetic energy. In some embodiments of the invention, the rigid elements are powered by an external electromagnetic field, which is applied wirelessly by an external device.

In some embodiments of the invention, the rigid elements include a patch antenna to receive signals and provide them to a device located external to the windshield. Alternatively, the rigid elements include an integrated circuit that serves as a signal amplifier (e.g. a low noise amplifier (LNA)) to enhance the signals received by the antenna. Further alternatively, the rigid elements may include an integrated circuit that proved extended functionality, for example an integrated circuit that functions as a GPS, a mobile TV, a WiFi transceiver, a Bluetooth transceiver or other devices. Optionally, an external display is controlled by the integrated circuit embedded in the windshield.

There is thus provided according to an exemplary embodiment of the invention, a method of embedding rigid elements in a windshield, comprising:

cutting two sheets of glass in a desired shape to serve as an upper layer and lower layer of the windshield;

inserting a layer of interlayer material for each of the two layers of glass, facing each other, between the two layers of glass;

placing the rigid elements between the two layers of interlayer material;

pushing the two layers of glass together to form a glass sandwich with the rigid elements and two layers of interlayer material between the upper and lower glass layers;

heating the glass sandwich while applying pressure to form a unified sheet of glass; and wherein the combined thickness of the layers of interlayer material is at least as thick as the rigid elements.

In an exemplary embodiment of the invention, the thickness of both layers of the interlayer material are identical. Alternatively, the thickness of one of the layers of the interlayer material is greater than the thickness of the other.

In an exemplary embodiment of the invention, the rigid elements are connected together electrically. Optionally, a flexible flat wire extends out from between the glass sandwich to provide an electrical connection to the rigid elements. In an exemplary embodiment of the invention, the rigid elements communicate wirelessly to an external device. Optionally, the rigid elements include a patch antenna. In an exemplary embodiment of the invention, the rigid elements include a rechargeable battery. Optionally, the rigid elements include a photoelectric cell to recharge the battery. In an exemplary embodiment of the invention, the rigid elements accept power wirelessly to recharge the battery. Optionally, the rigid elements are powered by an external electromagnetic field.

There is further provided according to an exemplary embodiment of the invention, a windshield with rigid elements embedded therein, comprising:

an upper layer of glass;
a lower layer of glass;
one or more rigid elements positioned between the two layers of glass;
a layer of interlayer material surrounding the rigid elements cured between the two layers of glass;
wherein the width of the interlayer material is equal or greater than the width of the rigid elements.

In an exemplary embodiment of the invention, the rigid elements include a patch antenna. Optionally, the rigid elements include an integrated circuit. In an exemplary embodiment of the invention, the integrated circuit serves as a front end receiver providing amplification for the patch antenna. In an exemplary embodiment of the invention, the integrated circuit serves as a global positioning receiver coupled to said patch antenna.

BRIEF DESCRIPTION OF THE DRAWINGS

The present invention will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1A:
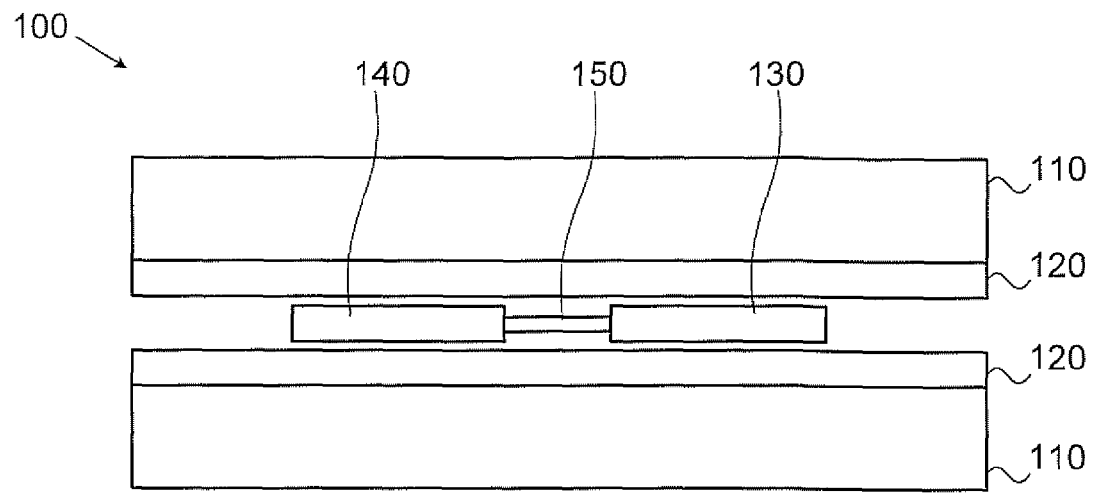
FIG. 1A is a schematic illustration of a cross sectional view of a rigid patch antenna and a rigid integrated circuit embedded between an upper and lower layer of glass of a windshield before lamination, according to an exemplary embodiment of the invention.

FIG. 1A is a schematic illustration of a cross sectional view of a rigid patch antenna 130 and/or a rigid integrated circuit 140 embedded between an upper and lower layer of glass 110 of a windshield 100 before lamination, according to an exemplary embodiment of the invention. Generally the windshield of a motor vehicle is prepared by laminating two sheets of glass together to increase the strength of the windshield and prevent shattering in the case of an accident. A single layer of an interlayer material (e.g. Polyvinyl butyral (PVB)) is used to bind the layers of glass together while providing optical clearness. The bonding process is performed using heat and pressure and results in a laminated glass that looks like a single sheet of glass and can essentially be handled like one. The laminated glass prevents cracks from passing from one side to the other.

Figure 2:
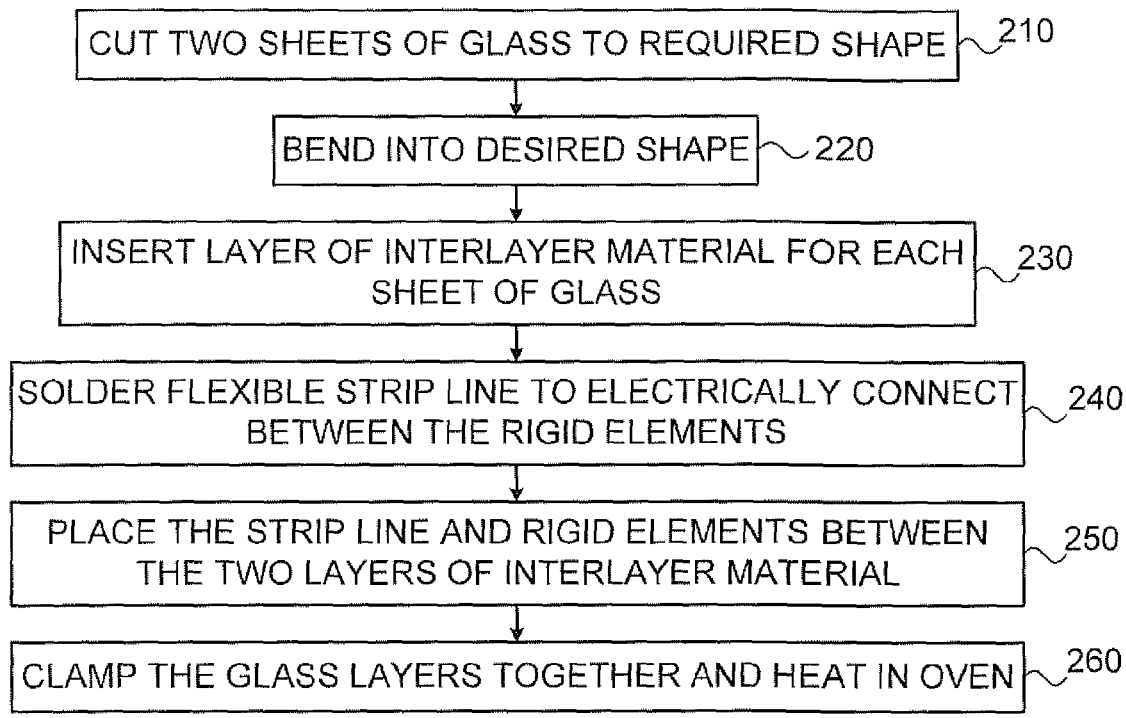
FIG. 2 is a flow diagram of the process of embedding rigid elements between the layers of a laminated glass, according to an exemplary embodiment of the invention.

FIG. 2 is a flow diagram 200 of the process of embedding rigid elements between the layers of a laminated glass, according to an exemplary embodiment of the invention;

In an exemplary embodiment of the invention, two sheets of glass 110 are cut (210) to the desired shape for preparing windshield 100 of a motor vehicle. Optionally, the thickness of the sheets of glass 110 is between 1-3 mm, for example about 2 mm. In an exemplary embodiment of the invention, the two sheets are glass are heated to a high temperature (e.g. 400-600° C. as is known in the art) and bent (220) under pressure to a pre-selected shape. In an exemplary embodiment of the invention, a layer of an interlayer material 120 (e.g. PVB) is inserted (230) for each sheet of glass 110. Optionally, the thickness of each layer is approximately the same as the thickness of the rigid elements (130, 140) that are to be placed between the layers of glass 110. In some embodiments of the invention the thickness of each layer of interlayer material 120 is only about half the thickness of the rigid elements (130, 140), but at least that the combined thickness of the two layers of interlayer material 120 is at least as thick as the thickness of the rigid elements (130, 140). As an example each layer of interlayer material may be about 0.3 mm to 1 mm, and the thickness of patch antenna 130 is about 0.3-1 mm.

In some embodiments of the invention, a flexible flat wire 150 (e.g. a coplanar strip line or other type of strip line) is soldered (240) to rigid elements (130, 140) to provide an electrical connection between the rigid elements (130, 140) and serve as an electrical connection out from between the layers of glass 110. Alternatively, other types of wires may be used. In some embodiments of the invention, flat wire 150 connects the rigid elements together sequentially, for example from patch antenna 130 to integrated circuit 140 and then out from the glass. Alternatively, flat wire 150 connects the rigid elements in parallel, for example connecting each rigid element independently out of the glass. In some embodiments of the invention flat wire 150 may be placed between the rigid elements (130, 140) or under the rigid elements (130, 140) to provide electrical contact with the rigid elements (130, 140).

In an exemplary embodiment of the invention, flat wire 150 and the rigid elements (130, 140) are placed (250) between the two layers of interlayer material 120 in a selected position so that flat wire 150 will extend to the edge of glass 110 and optionally slightly beyond the edge of glass 110 to enable attachment of a connector 160. In some embodiments of the invention, connector 160 includes thin legs, which are placed between the glass layers, so that the connecter will be firmly attached to the windshield. In an exemplary embodiment of the invention, connecter 160 serves as an interface for accommodating external connectors to electrically connect between flat wire 150 and an external device, such as a global navigation satellite system (GNSS) (e.g. the US global positioning system (GPS) or the European Galileo system), a mobile TV receiver or other devices. Optionally connecter 160 is adapted to enable plugging or screwing in connectors to provide a reliable electrical connection between the embedded rigid elements (130, 140) and the external device.

In an exemplary embodiment of the invention, the layers of glass 110 are clamped (260) together with the interlayer material and rigid elements in between, forming a glass sandwich. Optionally, the layers of glass 110 are placed in an oven and heated, while applying pressure to the glass sandwich, to cure and form a unified sheet of glass to serve as the windshield 100 of a motor vehicle. Optionally the heating process is performed at a temperature of about 150° C. to cure the interlayer material causing the rigid elements (130, 140) to melt into the interlayer material and become affixed between the glass sheets.

Figure 1B:
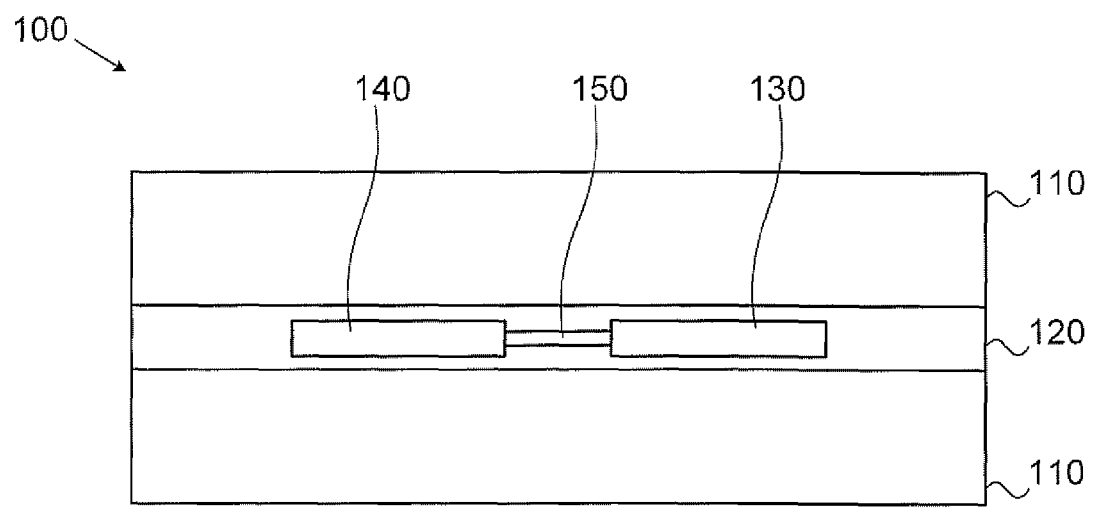
FIG. 1B is a schematic illustration of a cross sectional view of a rigid patch antenna and a rigid integrated circuit embedded between an upper and lower layer of glass of a windshield after lamination, according to an exemplary embodiment of the invention.

FIG. 1B is a schematic illustration of a cross sectional view of rigid patch antenna 130 and rigid integrated circuit 140 embedded between upper and lower layers of glass 110 of windshield 100 after lamination, according to an exemplary embodiment of the invention. Optionally, during the lamination process the rigid elements settle into the layers of interlayer material 120 displacing some of the interlayer material. Optionally, the two layers of interlayer material 120 provide cushioning for the glass layers 110 during the lamination process to prevent the rigid elements from causing damage to the glass layers 110.

Figure 3:
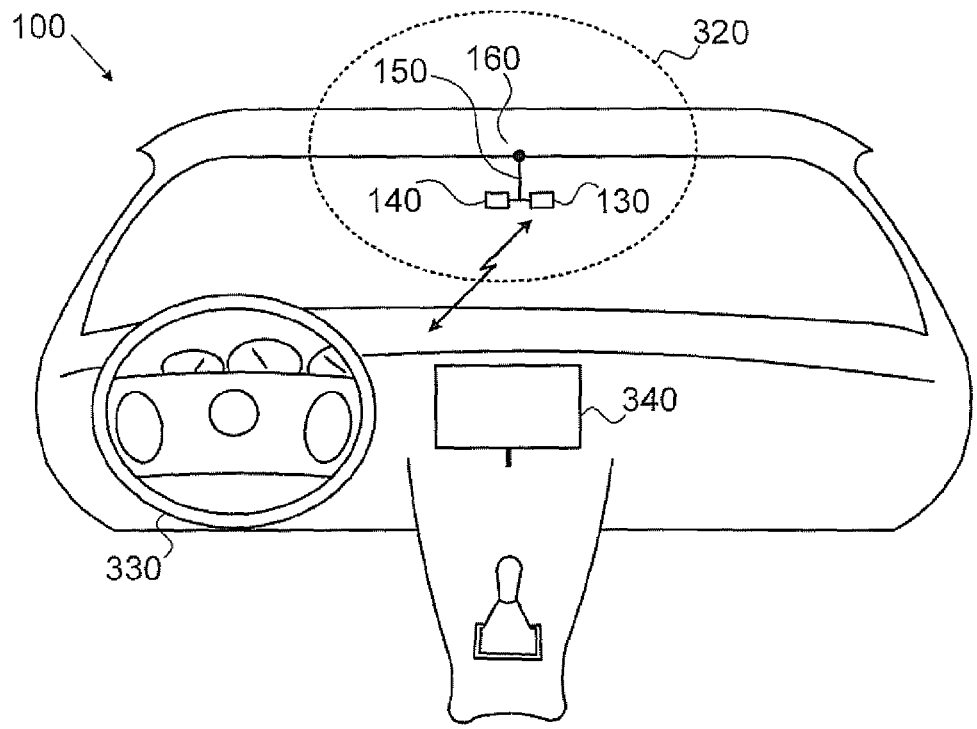
FIG. 3 is a schematic illustration of a windshield with a rigid patch antenna and a rigid integrated circuit embedded therein, according to an exemplary embodiment of the invention.

FIG. 3 is a schematic illustration of windshield 100 with rigid patch antenna 130 and rigid integrated circuit 140 embedded therein, according to an exemplary embodiment of the invention. In an exemplary embodiment of the invention, an electronic device 340, for example a GPS is positioned to the right of steering wheel 330 near the driver of the vehicle. Optionally, a cable is extended from electronic device 340 to embedded elements 320 to complement the functionality of electronic device 340. Alternatively, communications between embedded elements 320 and electronic device 340 are established wirelessly, for example using Bluetooth, WiFi or other protocols. In some embodiments of the invention, power is provided to embedded elements 320 from an external power source via connector 160 and flat wire 150. Alternatively or additionally, integrated circuit 340 may include a battery and a photoelectric cell to store power independently. In some embodiments of the invention, power for the functionality of embedded elements 320 may be transmitted wirelessly, for example from electronic device 340. Optionally, embedded elements 320 may or may not include flat wire 150 and connector 160, since all communications and power may be transferred wirelessly.

Optionally, various levels of cooperation may exist between electronic device 340 and embedded elements 320, for example:

1. Embedded elements 320 may include antenna 130, without integrated circuit 140. Optionally, electronic device 340 provides the rest of the functionality of the device and plugs into connector 160 to enhance antenna reception;

2. Embedded elements 320 may include antenna 130, and integrated circuit 140, wherein integrated circuit 140 serves as a front end receiver providing amplification (e.g. a low noise amplifier (LNA)) and electronic device 340 provides the rest of the functionality;

3. Embedded elements 320 may include antenna 130, and integrated circuit 140, wherein integrated circuit 140 provides extended functionality, for example serving as a full GPS receiver or full TV receiver. Optionally, electronic device 340 provides a display to display the information to a user.

Figure 4:
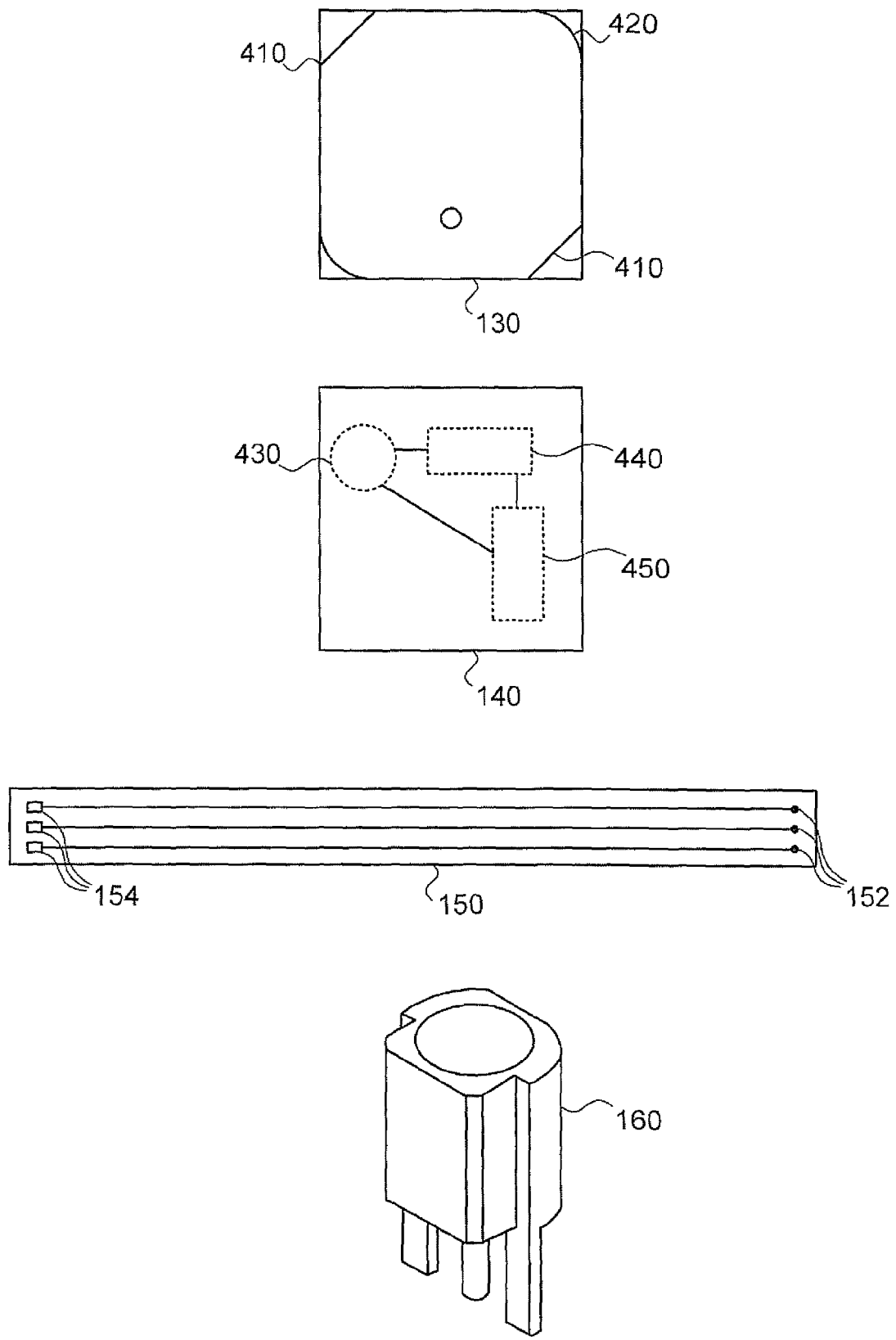
FIG. 4 is a schematic illustration of an enlarged view of the embedded elements in the windshield, according to an exemplary embodiment of the invention.

FIG. 4 is a schematic illustration of an enlarged view of the embedded elements 320 in windshield 100, according to an exemplary embodiment of the invention.

In an exemplary embodiment of the invention, the embedded elements 320 include patch antenna 130, integrated circuit 140, flat wire 150 and connector 160.

Optionally, patch antenna 130 may be formed as an essentially rectangular shaped unit, although it may deviate from the essentially rectangular shape, for example having truncated corners 410 or rounded corners 420 to enhance reception. Alternatively, patch antenna 130 may come in other shapes. In some embodiments of the invention, any low profile antenna may be used to serve as patch antenna 130.

In an exemplary embodiment of the invention, patch antenna 130 is filled with rigid dielectric tape material to provide it with a high dielectric coefficient so that it may be miniaturized and yet have a high gain coefficient. Optionally, patch antenna 130 may be as small as 10-50 mm×10-50 mm with a thickness between 0.3 mm-4 mm.

In an exemplary embodiment of the invention, integrated circuit 140 may have similar dimension as patch antenna 130 although they need not be identical in size. Optionally, integrated circuit 140 may include a battery 430, a photoelectric cell 440, a control circuit 450 and other elements.

In some embodiments of the invention, the elements include flexible flat wire 150 to connect between the embedded elements 320 and to provide electronic access to the embedded elements 320 from devices external to windshield 100. Optionally, flat wire 150 may have a length between 10-150 mm, although it may be longer or shorter. In an exemplary embodiment of the invention, its width may be between 0.5 to 10 mm and its thickness may be between 0.05 to 0.2 mm, so that it is not very noticeable through the windshield. In an exemplary embodiment of the invention, one side of flat wire 150 has contact points 152 that are soldered to patch antenna 130 and/or integrated circuit 140. Optionally, the other side of flat wire 150 has contact points 154 that are connected to a connector 160. Optionally, connector 160 serves as an interface for electrically connecting to the embedded elements 320. In some embodiments of the invention, flat wire 150 may include more than three leads and it may split into multiple branches and/or extend in various directions, to allow connecting multiple elements either sequentially or in parallel.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

It will be appreciated by persons skilled in the art that the present invention is not limited to what has been particularly shown and described hereinabove. Rather the scope of the present invention is defined only by the claims, which follow.

The invention claimed is:

1. A method of embedding rigid elements in a windshield, comprising:
    cutting two sheets of glass in a desired shape to serve as an upper layer and lower layer of the windshield;
    inserting a layer of interlayer material for each of the two layers of glass, facing each other, between the two layers of glass;
    placing the rigid elements between the two layers of interlayer material; wherein the rigid elements have a footprint that is smaller than the size of the sheets of glass;
    pushing the two layers of glass together to form to glass sandwich with the rigid elements and two layers of interlayer material between the upper and lower glass layers;
    heating the glass sandwich while applying pressure to form a unified sheet of glass, so that the rigid elements settle into the interlayer material displacing some of the interlayer material; and
    wherein the combined thickness of the layers of interlayer material is at least as thick as the rigid elements, so that when the rigid elements settle into the interlayer material the surrounding interlayer material protects the glass from being damaged by the rigid elements.

2. A method according to claim 1, wherein the thickness of both layers of the interlayer material are identical.

3. A method according to claim 1, wherein the thickness of one of the layers of the interlayer material is greater than the thickness of the other.

4. A method according to claim 1, wherein the rigid elements are connected together electrically.

5. A method according to claim 1, wherein a flexible flat wire extends out from between the glass sandwich to provide an electrical connection to the rigid elements.

6. A method to claim 1, wherein the rigid elements communicate wirelessly to an external device.

7. A method according to claim 1, wherein the rigid elements include a patch antenna.

8. A method according to claim 1, wherein the rigid elements include a rechargeable battery.

9. A method according to claim 8, wherein the rigid elements include a photoelectric cell to recharge the battery.

10. A method according to claim 8, wherein the rigid elements accept power wirelessly to recharge the battery.

11. A method according to claim 1 wherein the rigid elements are powered by an external electromagnetic field.

* * * * *